United States Patent [19]
U et al.

[11] Patent Number: 5,212,566
[45] Date of Patent: May 18, 1993

[54] SYNCHRONIZATION OF ESS/IIT WHEN SCANNING COMPLEX DOCUMENTS

[75] Inventors: Filomena K. U, Fairport; Kurt T. Knodt, Rochester; David E. Crocker, Fairport, all of N.Y.

[73] Assignee: Xerox Corporation, Stamford, Conn.

[21] Appl. No.: 589,951

[22] Filed: Sep. 28, 1990

[51] Int. Cl.$^5$ ............................................. H04N 1/40
[52] U.S. Cl. ................................. 358/444; 358/401; 358/404
[58] Field of Search ..................... 358/444, 404, 401; 395/115

[56] References Cited

U.S. PATENT DOCUMENTS

| 4,160,279 | 7/1979 | Fuwa | 358/288 |
|---|---|---|---|
| 4,367,493 | 1/1983 | Matteson | 358/293 |
| 4,564,864 | 1/1986 | Maeshima | 358/444 |
| 4,607,951 | 8/1986 | Seachman et al. | 355/51 |
| 4,748,514 | 5/1988 | Bell | 358/288 |
| 4,774,591 | 8/1988 | Matsunawa et al. | 358/444 |
| 4,819,025 | 4/1989 | Takahashi et al. | 355/14 R |
| 5,055,940 | 10/1991 | Tomatsuri | 358/444 |
| 5,087,979 | 2/1992 | Schaertel | 358/444 |

FOREIGN PATENT DOCUMENTS

| 0087975 | 7/1981 | Japan | 358/444 |
|---|---|---|---|
| 0115667 | 7/1984 | Japan | 358/404 |
| 0114083 | 6/1985 | Japan | 358/444 |

Primary Examiner—Edward L. Coles, Sr.
Assistant Examiner—Thomas L. Stoll
Attorney, Agent, or Firm—Lisa M. Yamonaco

[57] ABSTRACT

An electronic reprographic system with a scanner for scanning the document pages of a job and converting the document images scanned to pixels, a printer for making prints of the documents from the pixels in accordance with job programming instructions, a controller section with memory for use by both the scanner and the printer simultaneously, the scanner and printer operating asynchronously with respect to one another, the ability to abort scanning of a document when either the scanner or printer runs out of allocated system memory during operation, the system memory getting reallocated in preparation of a new scan, and the document that was not completely scanned getting rescanned.

6 Claims, 19 Drawing Sheets

SYNCHRONIZATION OF ESS/IIT WHEN SCANNING COMPLEX DOCUMENTS

The invention relates to electronic reprographic systems, and more particularly, to a process for synchronizing the operation of an automatic document scanner with an electronic sub-system (ESS) controller.

In electronic reprographic systems, documents being scanned by an automatic document scanner, also known as an image input terminal (IIT), are processed by an electronic sub-system controller and stored in permanent memory pending printing, editing or later use. Prior to storage in permanent memory, processing of the image data requires that the data be held in temporary memory while processing takes place. However, due to characteristics of individual documents, the capacity of the temporary memory may be insufficient and data may be coming into the temporary memory faster than it can be transferred from the temporary memory to the permanent memory causing the data to overflow and be lost. Therefore, it would be desirable and advantageous to protect against this and further provide a process, should a problem arise, to recapture any data that is lost.

In the prior art, U.S. Pat. No. 4,160,279 to Fuwa discloses an optoelectronic reading apparatus wherein the scanning speed is automatically decreased as buffer memory increases such that scanning speed is controlled to correspond to the data compression rate. U.S. Pat. No. 4,367,493 to Matteson discloses a raster scanner apparatus having a relatively small buffer for storage of image data wherein a document transport means is stopped, accelerated or decelerated from a controlled scanning speed with respect to buffer supply. U.S. Pat. No. 4,607,951 to Seachman et al. discloses an image input terminal wherein the image input terminal converts a document being scanned into video image signals which are output to memory, a buffer or a printer. U.S. Pat. No. 4,748,514 to Bell discloses a variable rate scanning control which regulates the scanning speed of a printer carriage wherein the scanner has a buffer, a buffer capacity sensor for continuously monitoring the residual capacity of the buffer, a motion sensor for the carriage and a controller for regulating the speed of the carriage to match a signal output rate with a signal input rate while maintaining a predetermined buffer capacity. U.S. Pat. No. 4,819,025 to Takahashi et al. discloses a color scanner wherein a control means controls a document scan means to reinitiate a scan if a scan error has been detected.

In contrast, the present invention provides a process for synchronizing transfer of image data to and from a permanent memory means in an electronic printing system having a printer for producing prints from the image data and a source of the image data, comprising the steps of: allocating at least one first buffers for temporarily holding incoming image data from the source pending transfer to the permanent memory means and at least one second buffers for temporarily holding outgoing image data from the permanent memory means to the printer; while filling the first and second buffers, monitoring the rate at which the buffers are emptied by transfer of the image data to the permanent memory means and transfer of the image data to the printer for printing; where the rate at which the second buffers are being emptied is less than the rate at which the second buffers are being filled, temporarily interrupting the input of the image data to the first buffers by the source; transferring at least one of the first buffers to the second buffers whereby to increase the number of second buffers available to hold the image data for the printer and enable the printer to print without interruption; when the increased number of second buffers are no longer required, transferring the one first buffer back to the first buffers; and re-actuating the source to input the image data to the first buffers.

Figure 1:
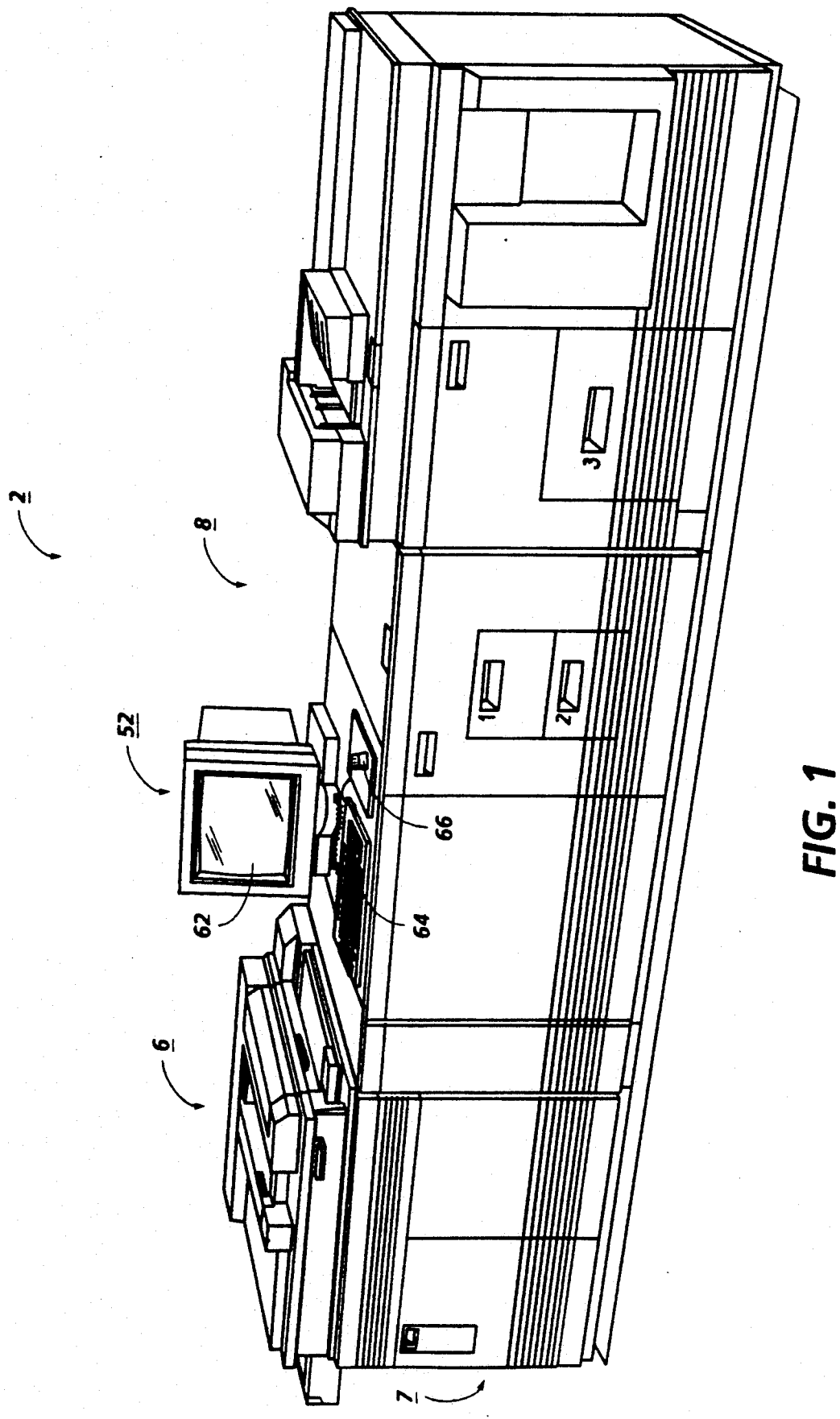
FIG. 1 is a view depicting an electronic reprographic system incorporating the synchronization system of the present invention.
Figure 5A:
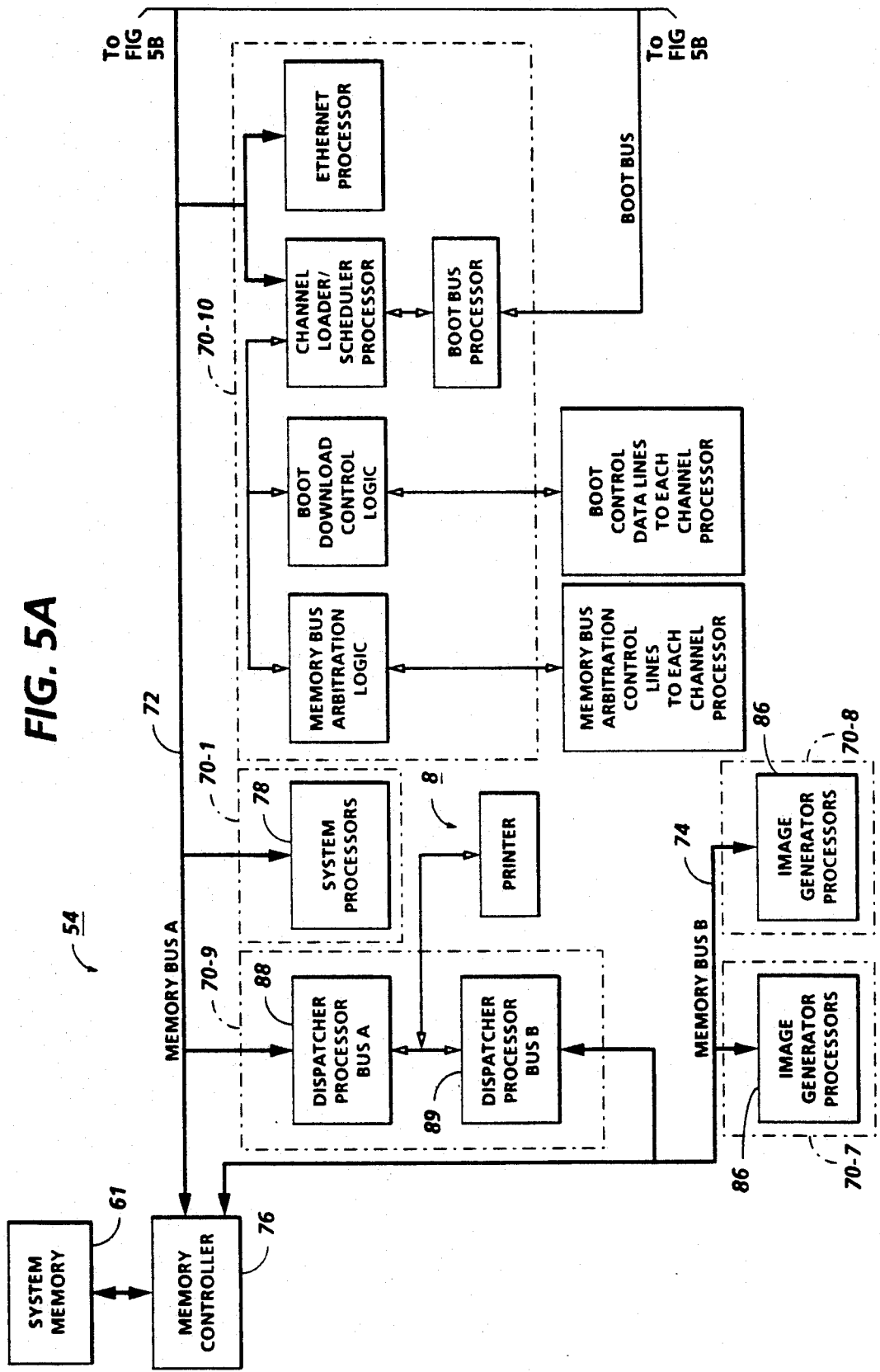
Figure 5B:
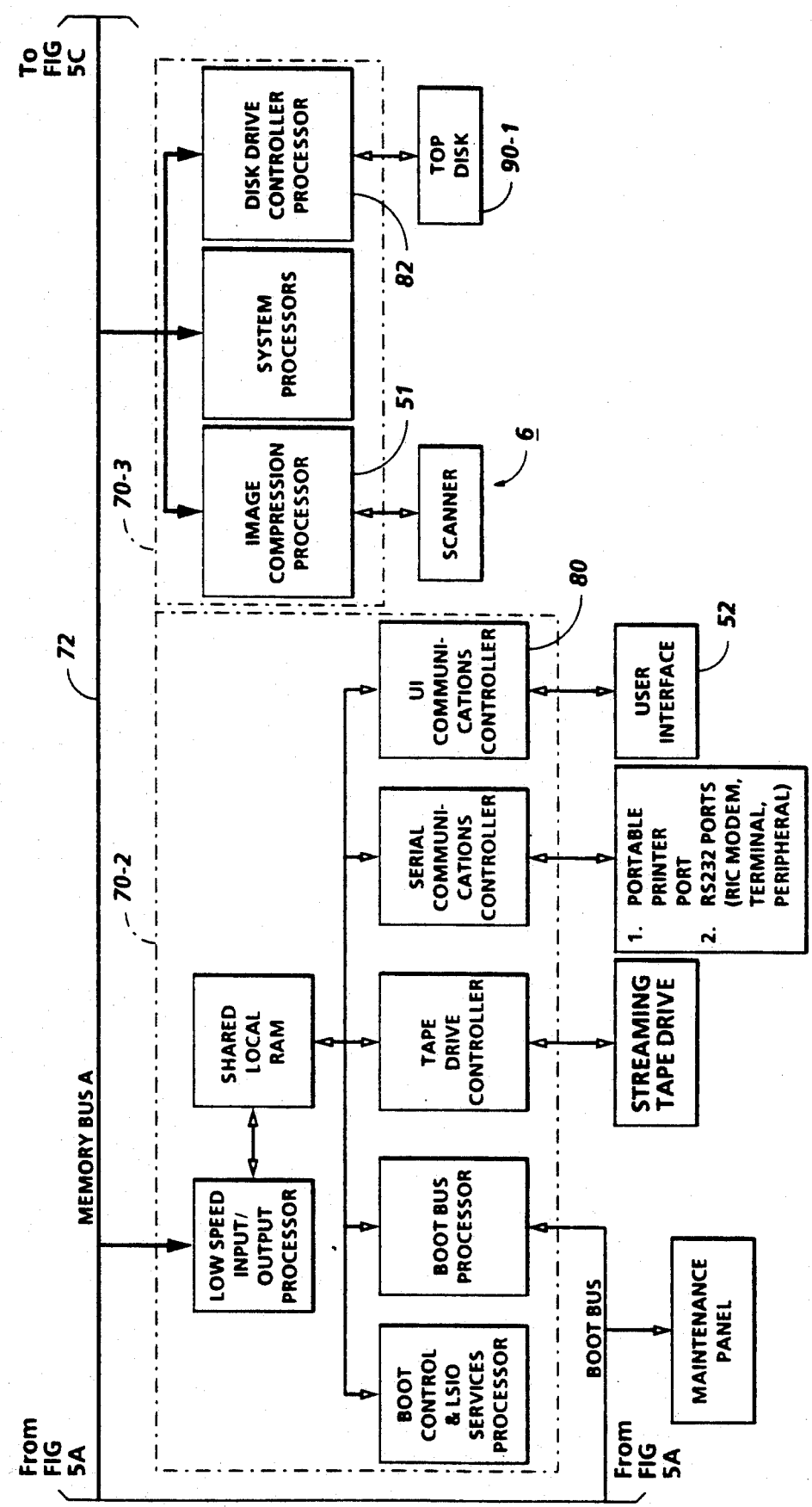
Figure 5C:
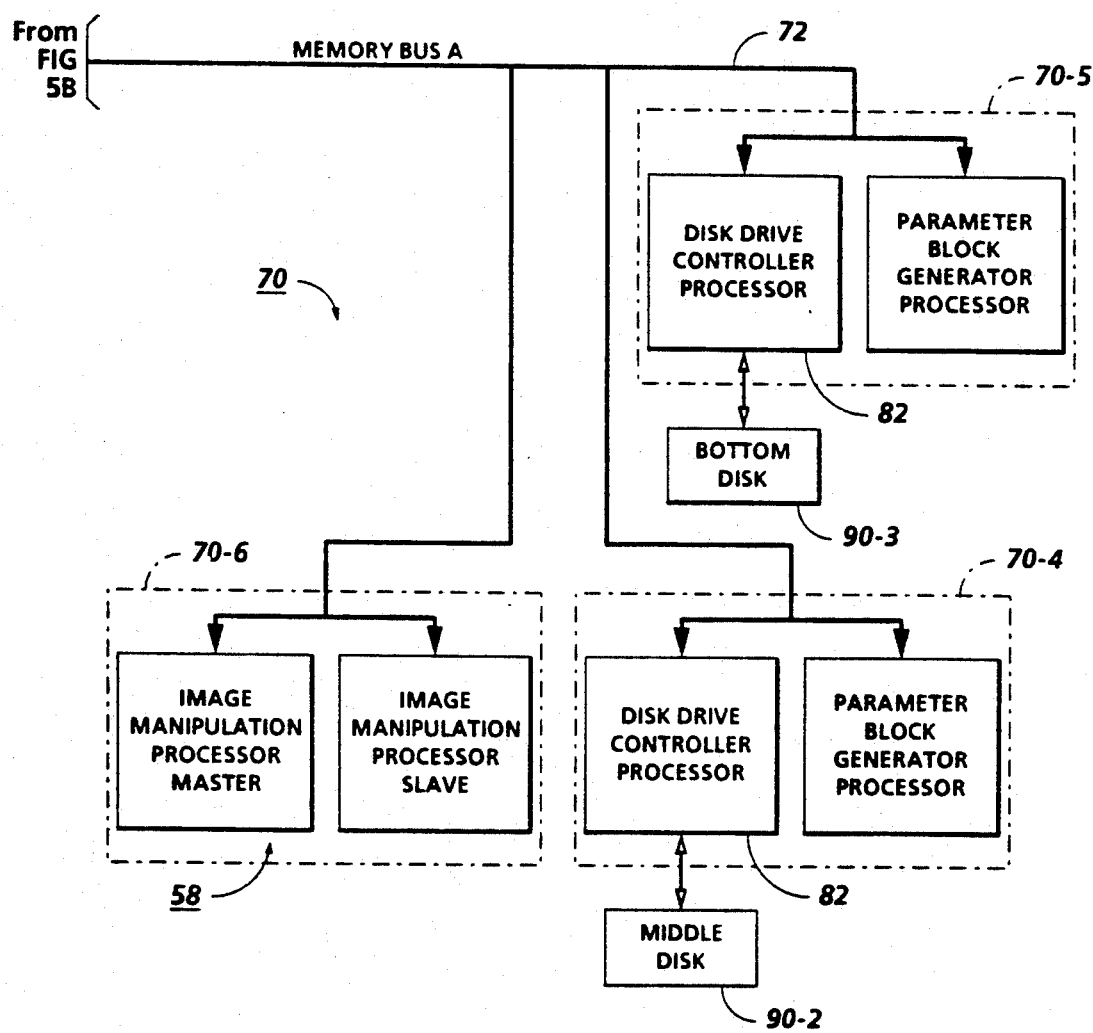
Figure 6:
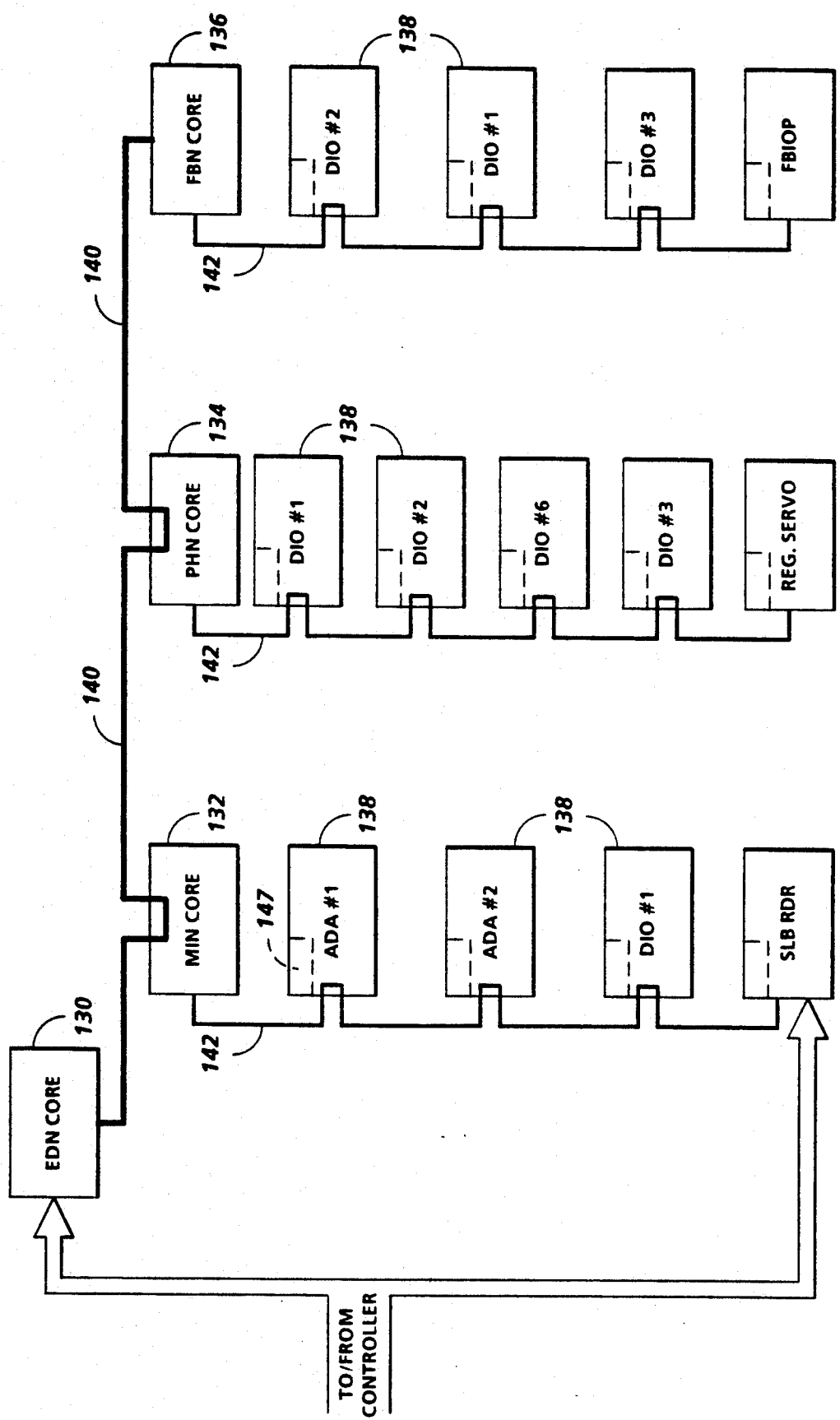
Figure 7:
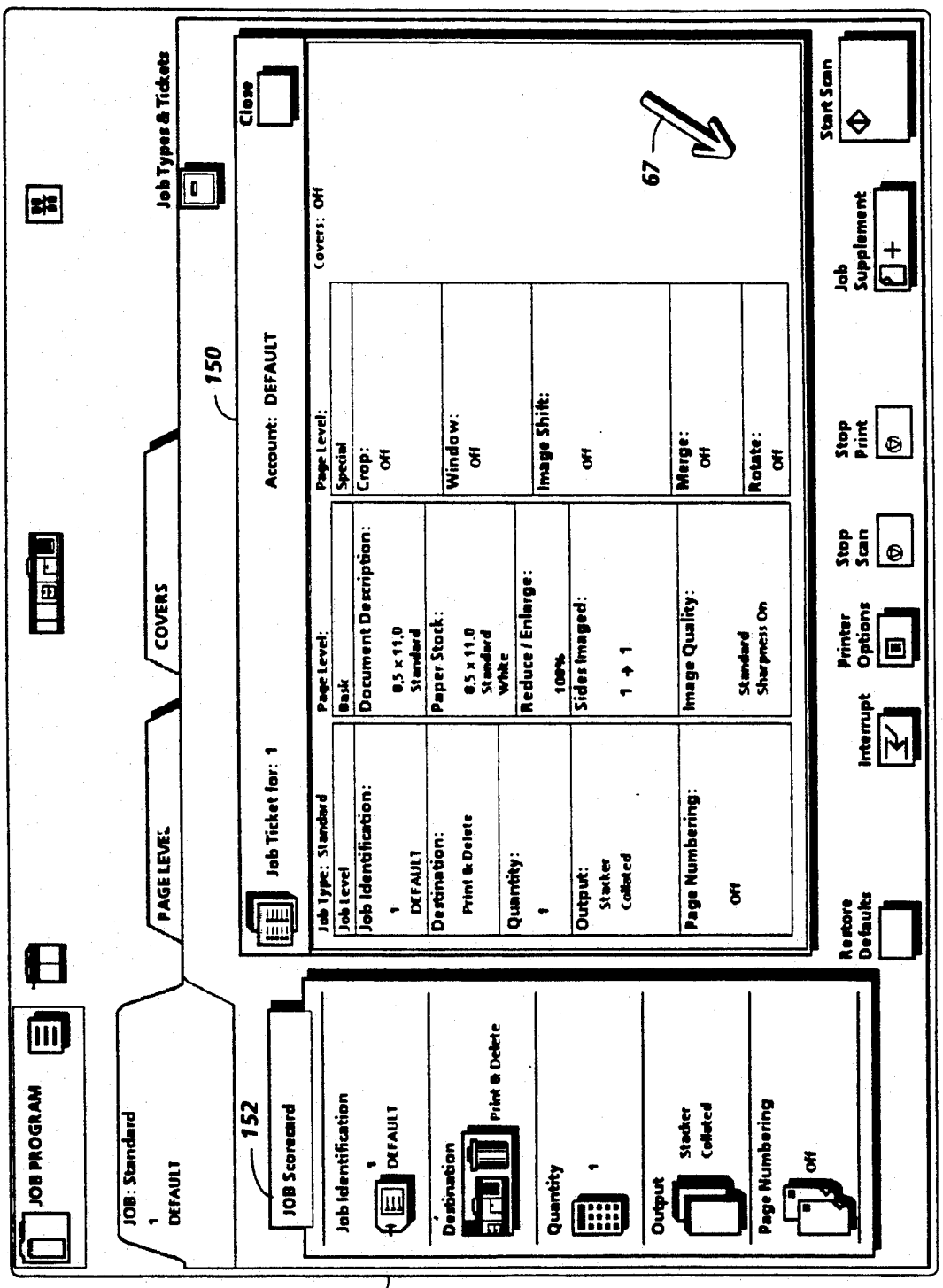
Figure 8:
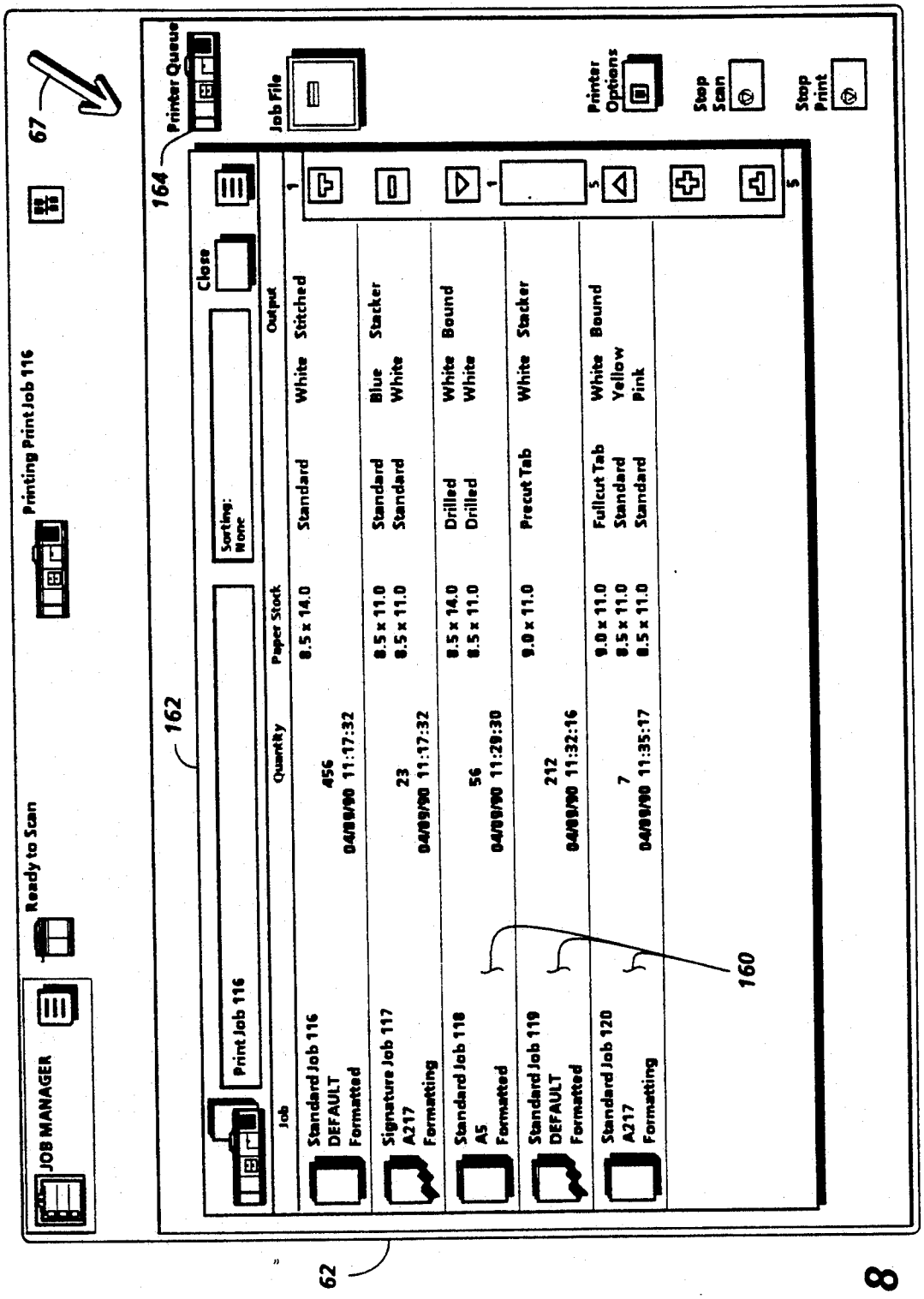
Figure 9A:
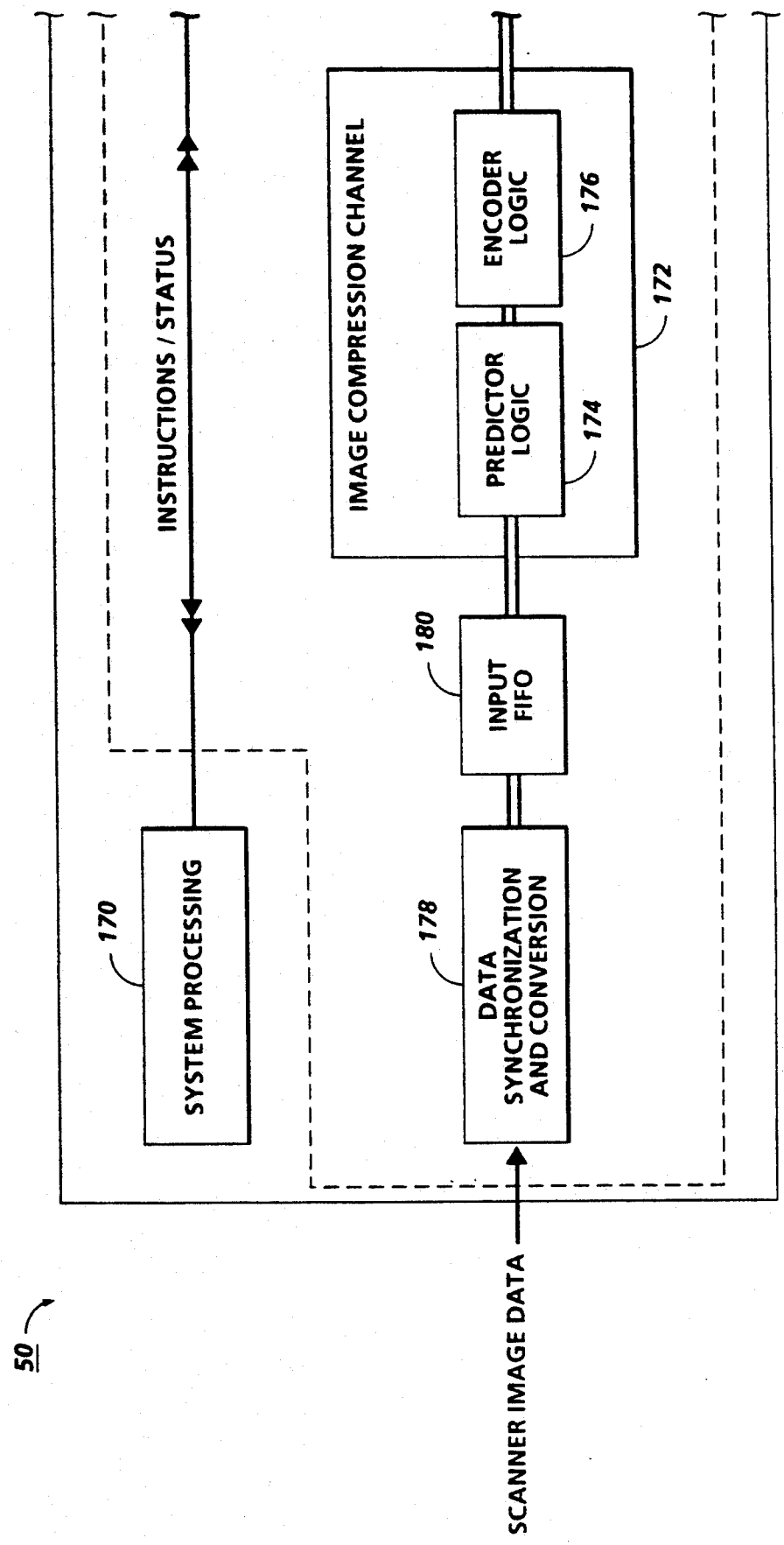
Figure 9B:
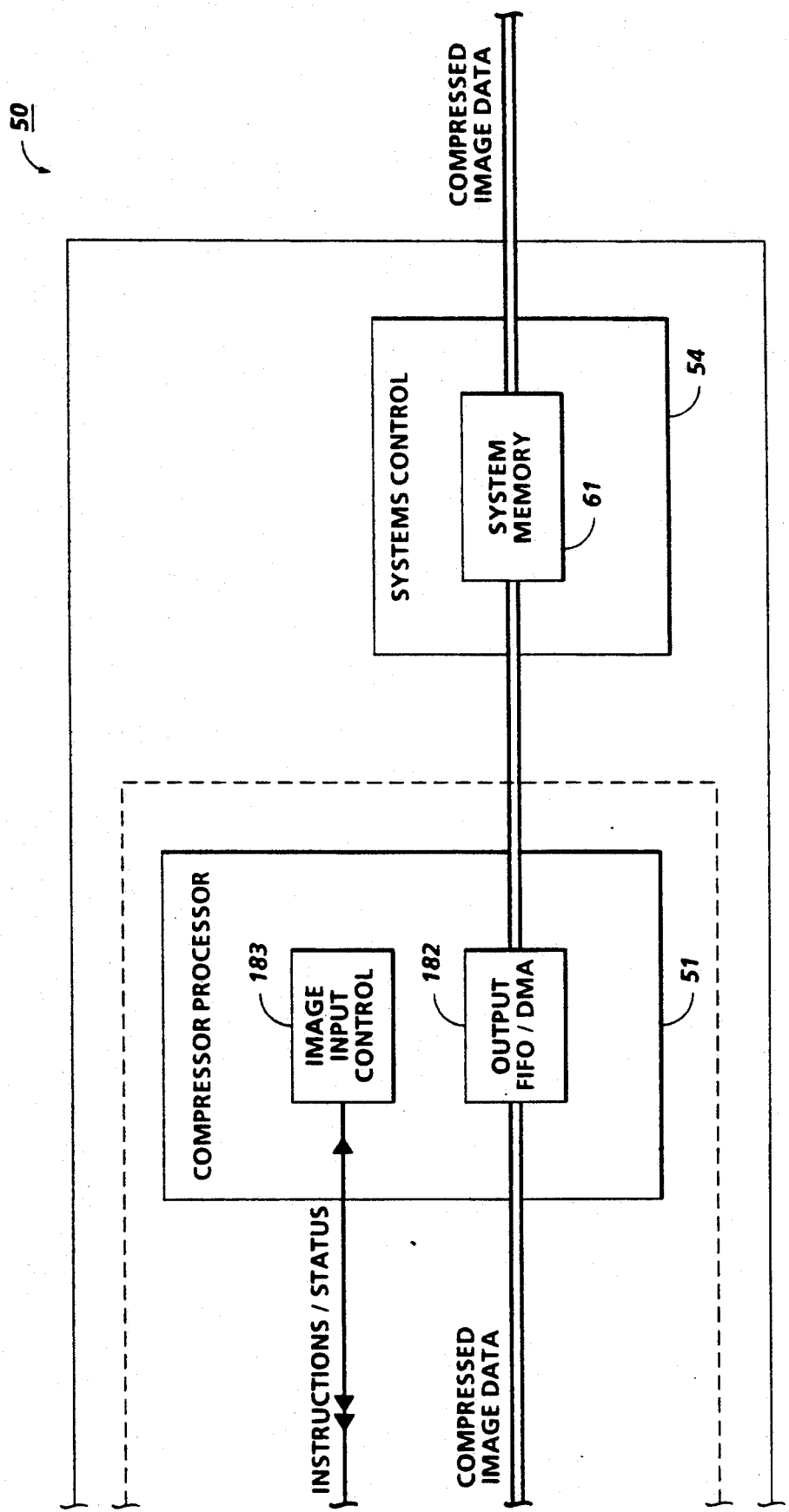
Figure 10:
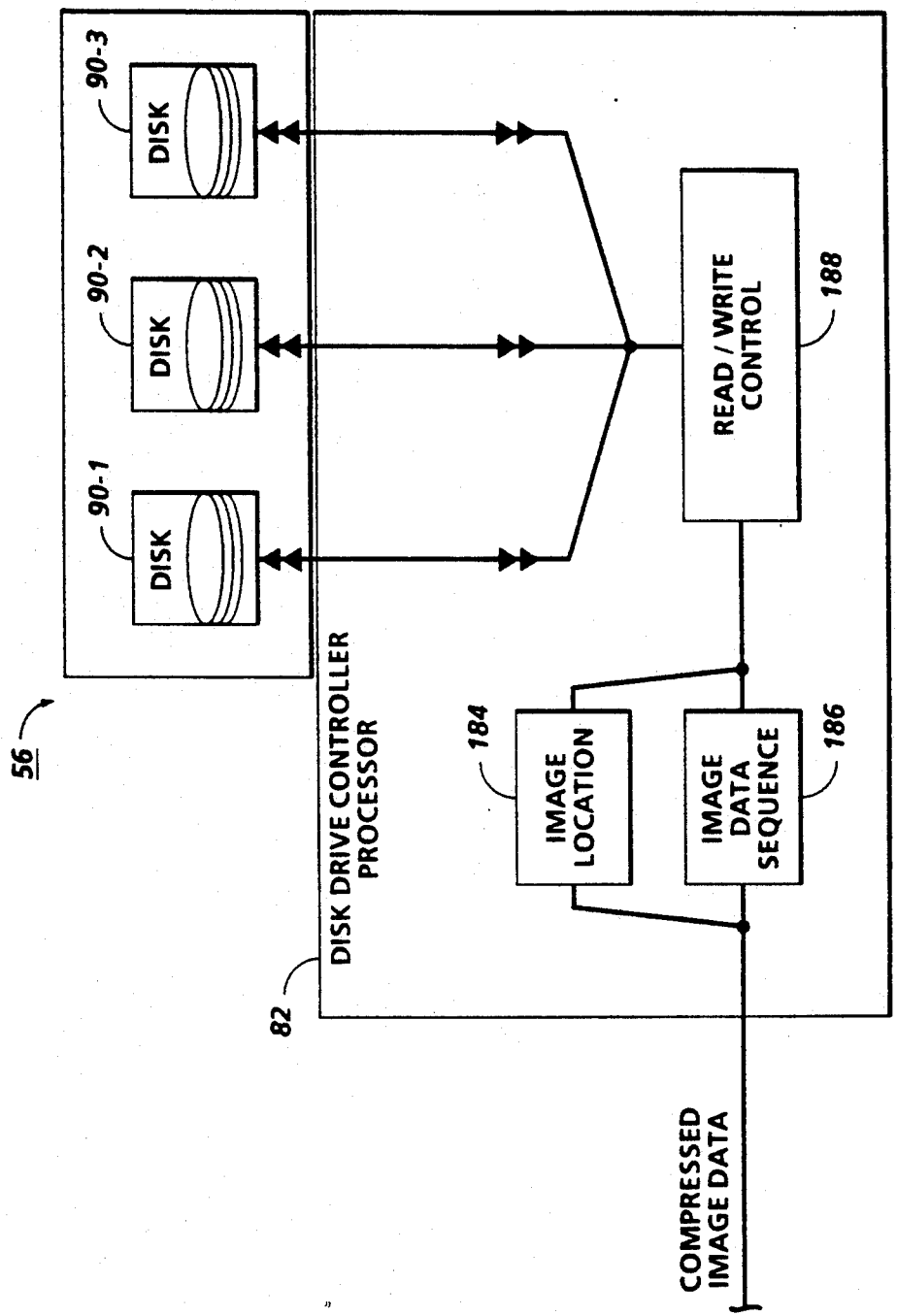
Figure 11:
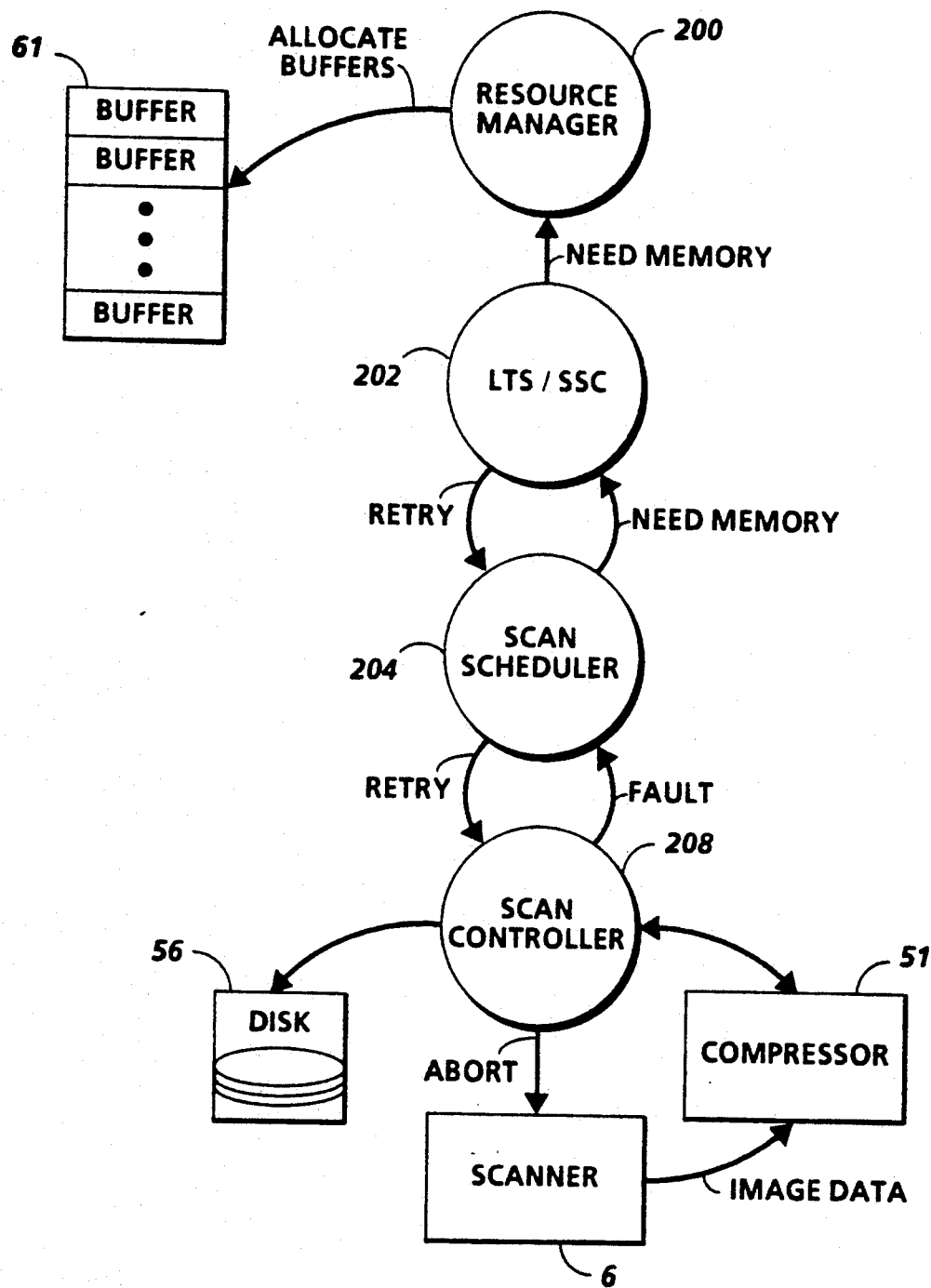
Figure 12:
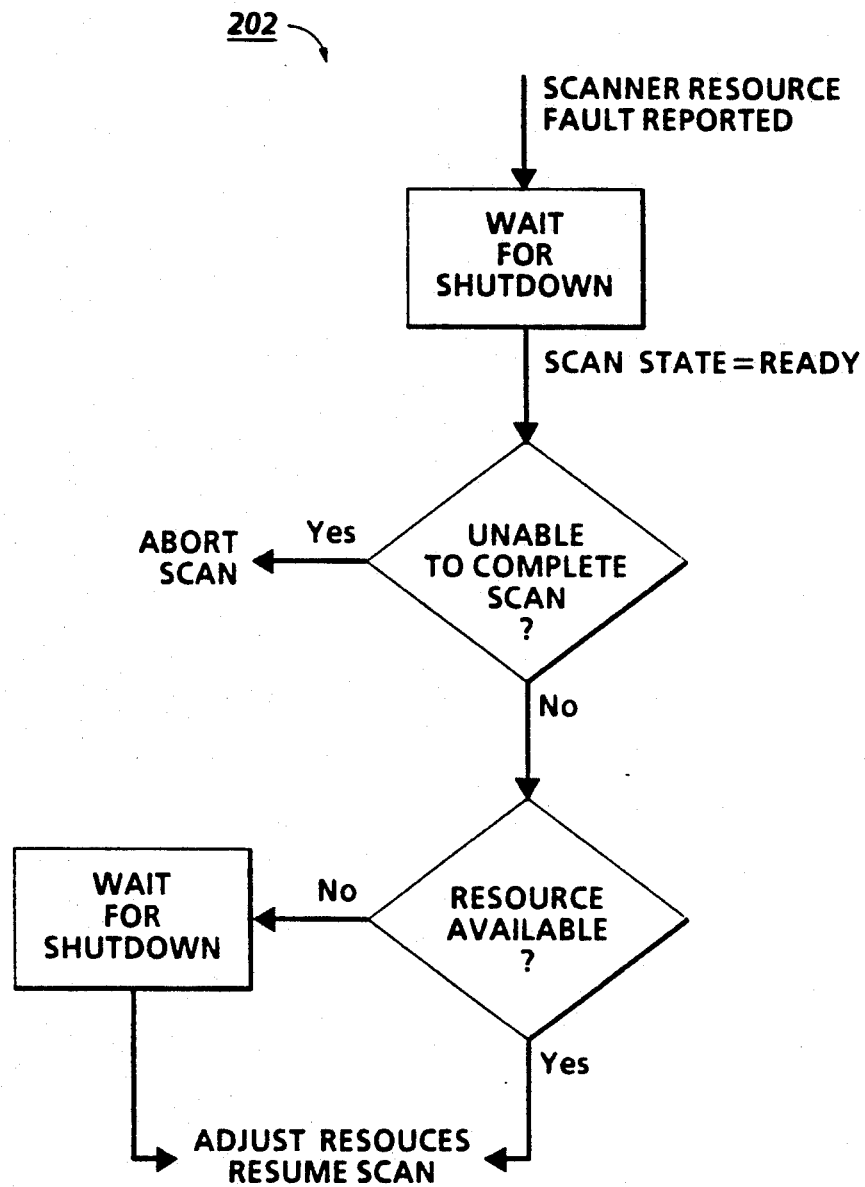
Figure 13:
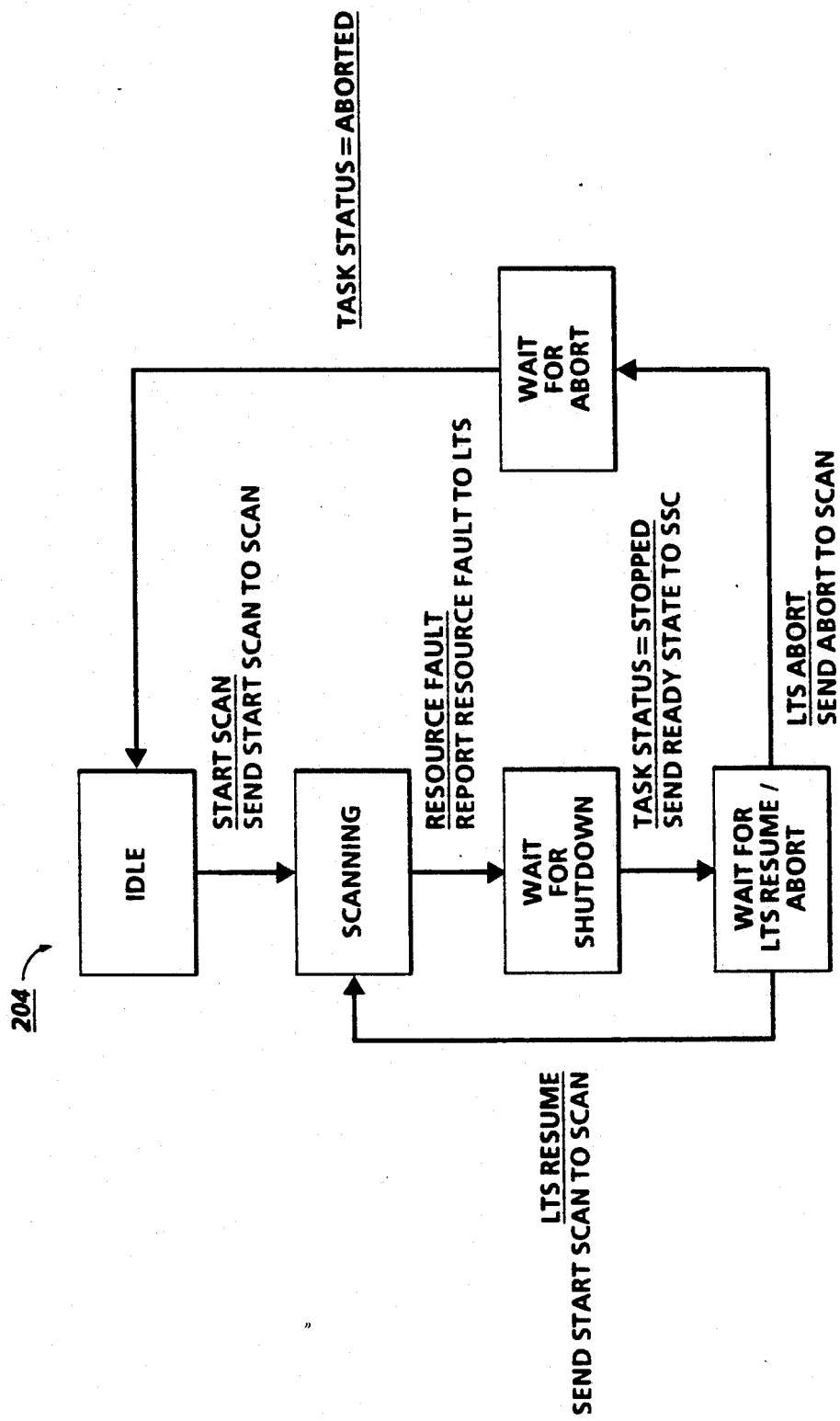
Figure 14:
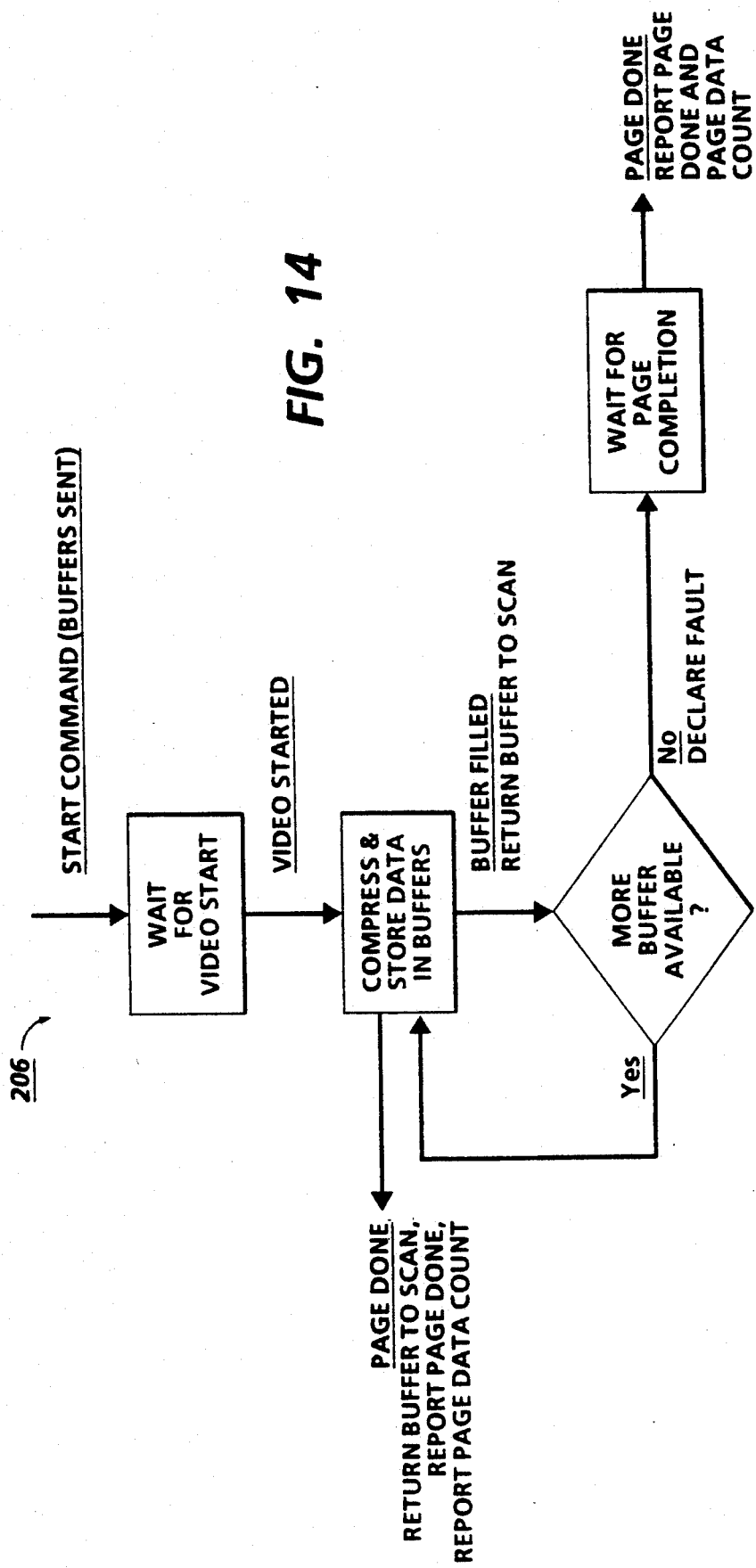
Figure 15:
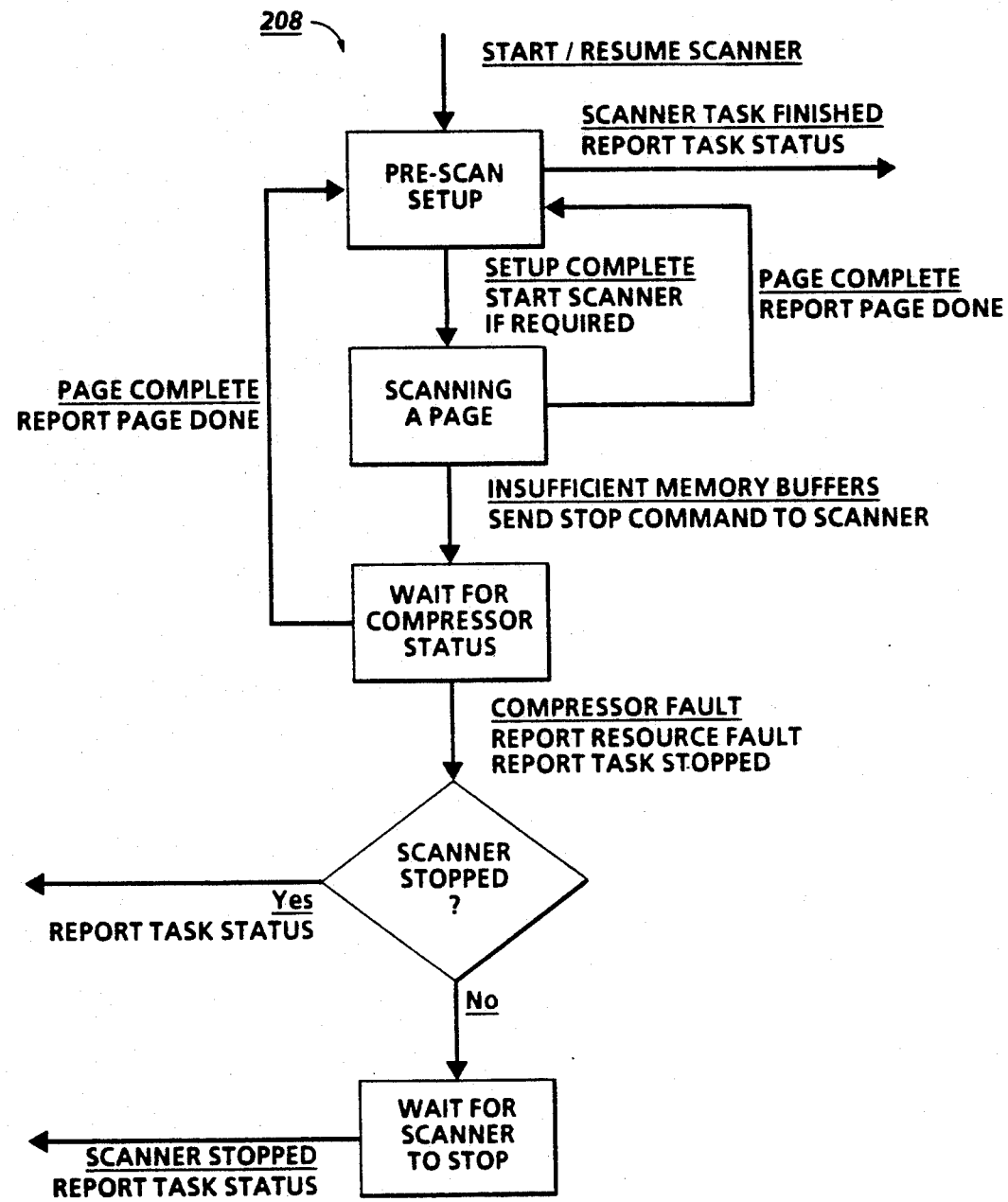

FIGS. 5A-5C comprise a schematic block diagram showing the major parts of the control section for the electronic reprographic system shown in FIG. 1;

FIG. 6 is a block diagram of the Operating System, together with Printed Wiring Boards and shared line connections for the electronic reprographic system shown in FIG. 1;

FIG. 7 is a view depicting an exemplary job programming ticket and job scorecard displayed on the User Interface (UI) touchscreen of the electronic reprographic system shown in FIG. 1;

FIG. 8 is a view depicting an exemplary print queue of jobs to be printed on the UI touchscreen;

FIGS. 9A and 9B comprise a block diagram of the image input control section for the electronic reprographic system shown in FIG. 1;

FIG. 10 is a block diagram of the document storage control section for the electronic reprographic system shown in FIG. 1;

FIG. 11 is a flow diagram for image capture in the electronic reprographic system shown in FIG. 1;

FIG. 12 is a state transition diagram further showing the Long Term Scheduler depicted in FIG. 11;

FIG. 13 is a state transition diagram further showing the Scan Scheduler depicted in FIG. 11;

FIG. 14 is a state transition diagram further showing the Compressor function depicted in FIG. 11;

FIG. 15 is a state transition diagram further showing the Scan Controller function depicted in FIG. 11.

Figure 16:
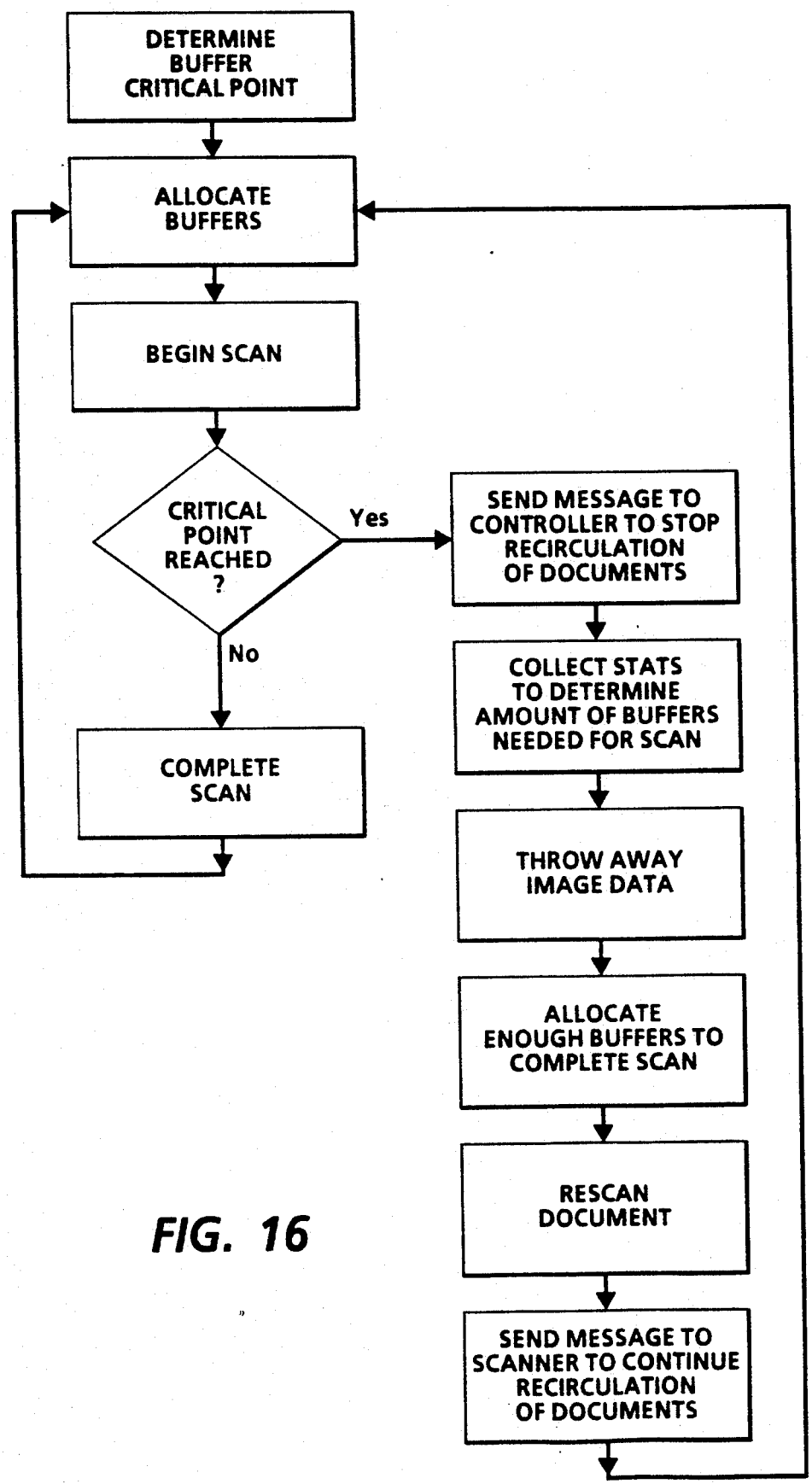

FIG. 16 is a flow chart depicting the method used to synchronize the scanner section and control section of the electronic reprographic system shown in FIG. 1.

Figure 2:
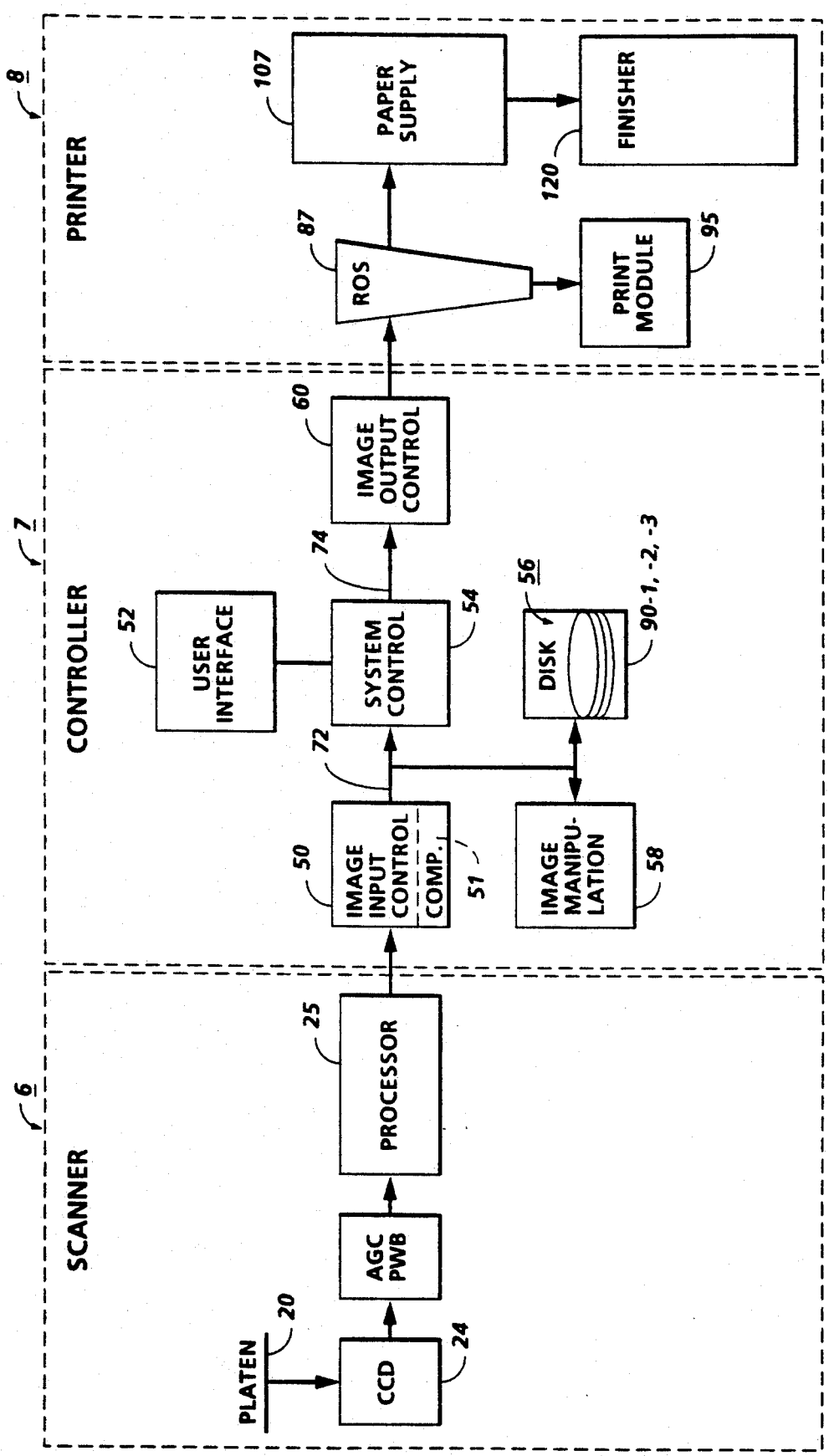
FIG. 2 is a block diagram depicting the major elements of the electronic reprographic system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
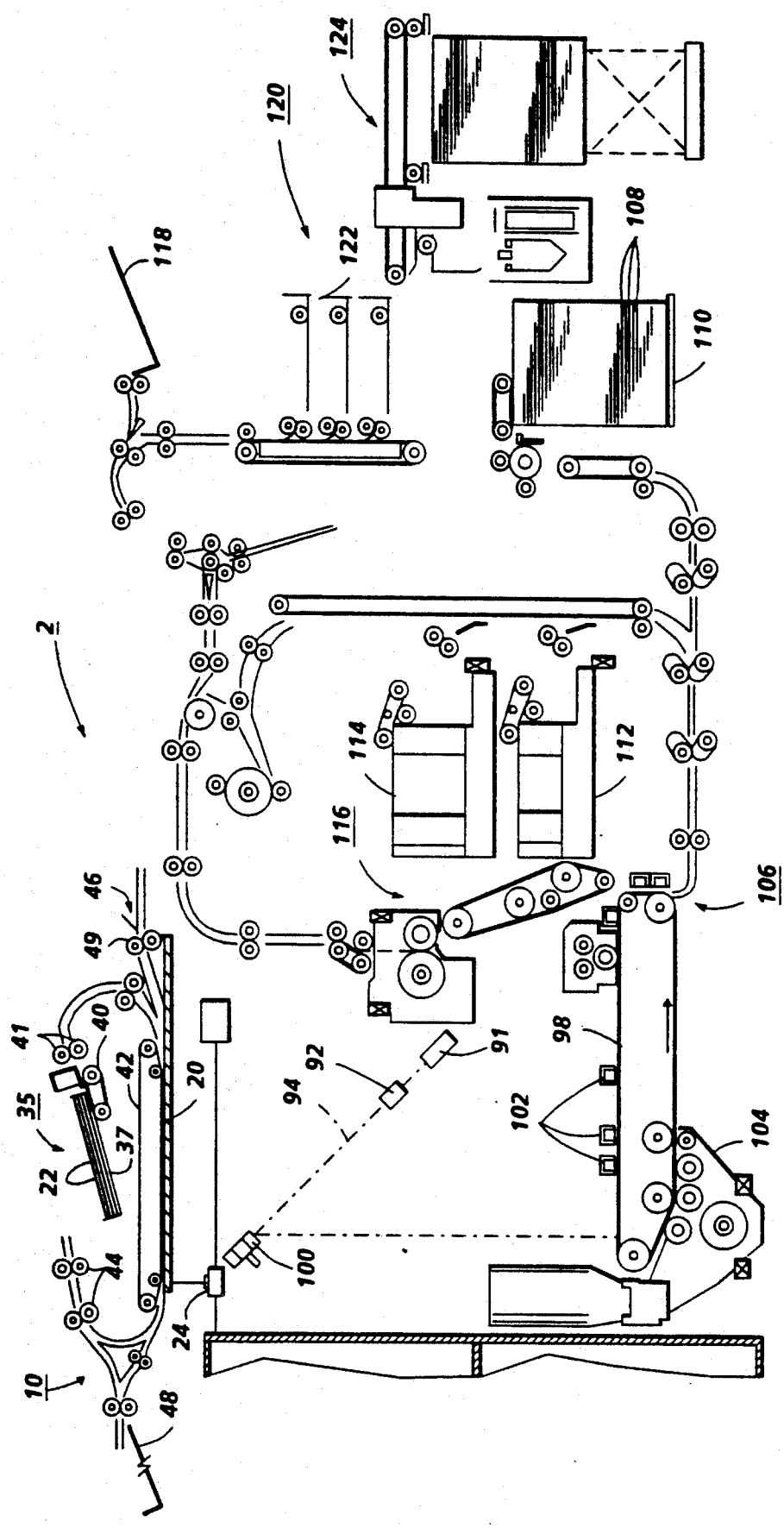
FIG. 3 is a plan view illustrating the principal mechanical components of the electronic reprographic system shown in FIG. 1.
Figure 4:
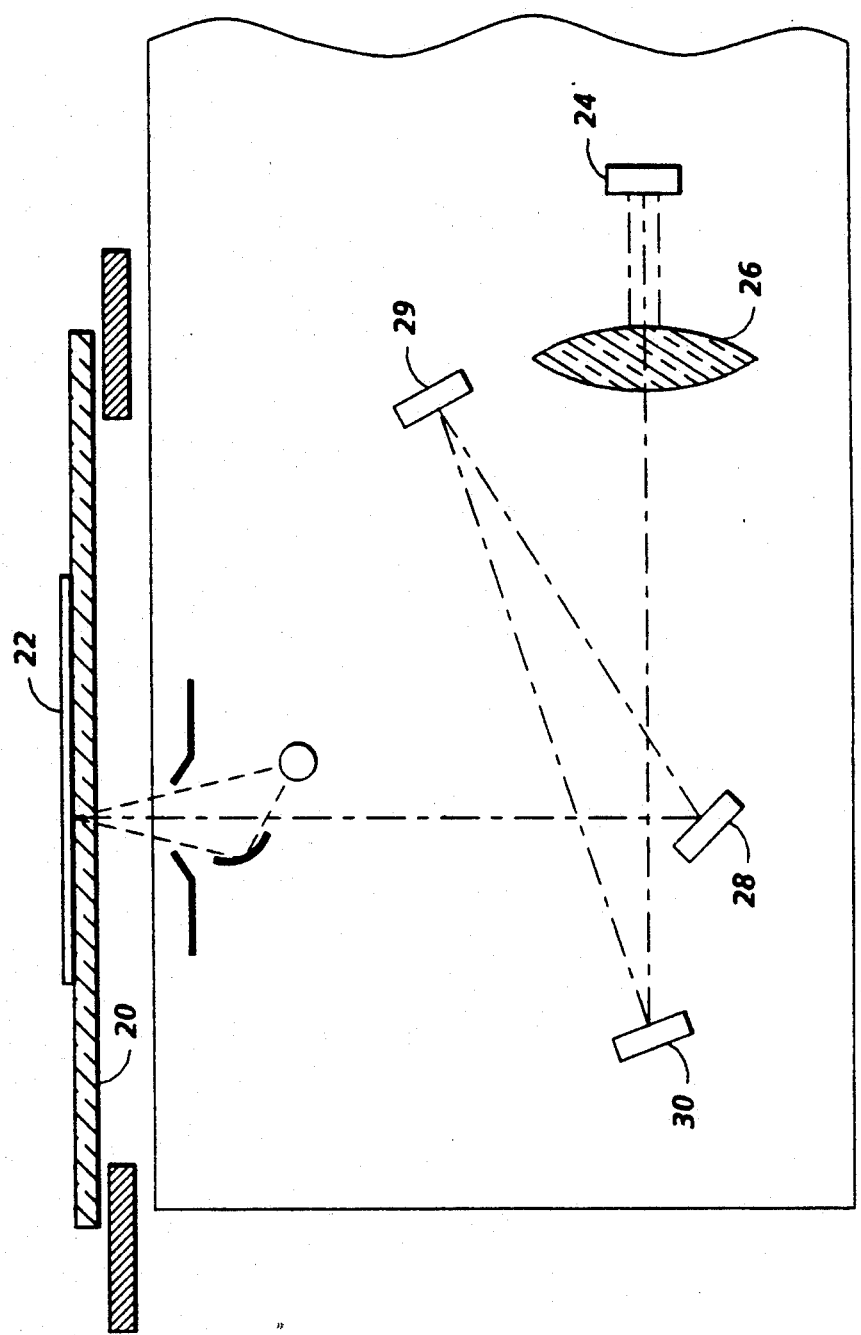
FIG. 4 is a schematic view showing certain construction details of the document scanner for the electronic reprographic system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 27 and mirrors 28, 29, 30 cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer, and for purposes of explanation, is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56, used as permanent memory, has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A–5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors or image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7, while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed, while Job Scorecard 152 displays the basic instructions to the system for printing the job.

Referring also to FIG. 8, when a job 160 is printed, the job is moved from main memory 56 into a print queue 162. A PRINTER QUEUE icon 164 on touchscreen 62, when actuated, displays the current print queue with a list of the jobs in the queue on touchscreen 62. Each job 160 in print queue 162 has a job descriptor identifying the job by name and job number; the media size, type, and color; and type of finishing Print queue 162 is ordered by priority and time of arrival of the job in the print queue.

Referring now to FIGS. 9A-B and 10, binary image data from scanner 6 goes to image input controller 50 for further processing. Data synchronization and conversion circuit 178 synchronizes the input of the binary image data from scanner 6 and converts the binary serial data to eight bit parallel data. A FIFO input buffer 180 provides temporary storage for the image data before being processed by image compression channel 172. Image compression channel 172 comprises predictor logic circuit 174 which predicts the next scanline based upon the previous scanline and encoder logic 176. Encoder logic 176 further processes the image data by encoding each scanline of image data based on the run lengths of white within the predicted scanlines.

Compressor processor 51 responds to instructions from system processing unit 170 to program job parameters for predictor logic 174 and encoder logic 176. Compressor processor 51 further includes output FIFO buffer 182 providing temporary storage for compressed image data before being stored in system memory 61. Memory 61 is managed as a chain of buffers by resource manager 200 as shown in FIG. 11.

From system memory 61, the data is transferred to main memory 56. Transfer of main memory 56 is controlled by image location logic 184, image data sequence logic 186, and write/read control logic 188 of disk drive controller processor 82. Image location logic 184 locates the sector on disk drives 90-1, 90-2, 90-3 for each image file. Each image file is located on one disk and can be stored on any of disks 90-1, 90-2, 90-3. Image data sequence logic 186 controls the disk writing sequence while write/read control logic 188 provides the actual instructions to transfer data between main memory 56 and system memory 61.

As will be understood, the capacity of system memory 61 is limited and accordingly must be shared by several components such as printer 8 and scanner 6 simultaneously. For example, scanner 6 may be scanning an image and storing the data in system memory 61 while printer 8 is using system memory 61 to temporarily hold job 160 currently being printed in print queue 162 as shown in FIG. 8. Therefore, it is necessary to allocate buffers within system memory 61 to these different components while processing jobs. For allocation, printer 8 has priority over scanner 6 and will be allocated buffers first. For further information on system control, reference and incorporation by reference is made to U.S. patent application No. 07/591,325 filed on Sep. 28, 1990 entitled "System State Controller for an Electronic Image Processing System" in the names of Prokop et al.

Referring now to FIGS. 11-15, upon processing a job, resource manager 200 allocates a predetermined number of buffers to each component requesting the use of system memory 61. During runtime, if a component requires more memory, or buffers, than what was allocated to it, a fault will occur. If a fault occurs and the required number of buffers is greater than the number of buffers allocated, a fault status command is sent and resource manager 200 responds by reallocating the number of buffers. Fault and status information flows among scanner 6, scan controller 208, scan scheduler 204 compressor unit 206 and LTS/SSC 202. Upon a fault condition cause by an insufficient number of buffers allocated to scanner 6, scan controller 208 sends a fault command to LTS/SSC 202 which in turn sends a control command to resource manager 200 requesting an adjustment in buffer allocation in memory 61. Scan controller 208 then receives the necessary allocation of buffers from resource manager 200 to complete the scan without fault.

During the image data compression process, the compressed image data output by encoder logic 172 is stored in buffers previously allocated in system memory 61. The number of buffers available to the chain is predetermined in software before the scanning begins. As each buffer becomes filled, the contents of that buffer are transferred to main memory 56. This allows a fresh buffer to be added to the chain of buffers available for storing image data. If an image is complex, all available buffers may become filled and no empty buffers will be available to store further incoming video data thus, image data may be lost. To prevent a loss in image data, scan controller 208 predicts the complexity of the documents being scanned and compares the predicted document complexity with the amount of available buffer space allocated in memory 61. Where the prediction indicates that buffer space is insufficient, scanning of document 22 can be aborted allowing time for resource manager 200 to reallocate additional buffers to scanner 6 by taking buffers away from other clients to facilitate completion of the rescan of document 22 without fault.

In order for scan controller 208 to predict when the number of previously allocated buffers will run out in time to abort the scan, a critical point time is established which represents the time required for controller 7 to send a control message to scanner 6 to abort the scan with time for scanner 6 to respond with scan termination. In the disclosed embodiment the critical point is calculated using the following assumptions: Buffer size=48K words/buffer, image data rate=21.43 MHz, time required to send a control message from controller 7 to scanner 6=35 mSec. To ensure the control signal gets to scanner 6 in time to abort the scan, add a safety factor of 35 mSec. for software processing time. Therefore, the critical point time requirement=70 mSec. Assuming a compression ratio of worst case=1:1, the number of buffers to be filled during the critical point time is 2. With the critical point established at two buffers, the number of buffers necessary to begin scan of a page is set at four. When the first buffer is being used to store information to disks 90-1, 90-2, 90-3, the second buffer is in the midst of being filled. If no empty buffers are available to be added to the chain of buffers at this time, the two remaining empty buffers on the chain of buffers will ensure sufficient time for controller 7 to send the abort scan request to scanner 6 and keep document 22 on platen 20.

It is understood that the calculations as to critical point time and number of buffers required and the assumption as to buffer size, image data rate, message time, safety factors, and compression ratios are exemplary and that the invention is not intended to be so limited. Calculations based on other data and/or assumptions may provide different critical point times and give different buffer numbers.

To allow scan controller 208 to calculate, and resource manager 200 to allocate, enough buffers to successfully complete the rescan of document 22 statistical data is collected. The statistical data is preferable calculated determining the compression ratio of that portion of the image data compressed thus far, before abortion of the scan, and extrapolating that information for the entire document. Alternately, the scan can continue without storing the image data to disk, but obtaining an accurate estimate of the full document compression ratio. Both methods yield the number of buffers required to successfully complete the faulted scan.

As described, where the document being scanned is too complex to be stored in the available allocated buffers, the scan is aborted. Once aborted, LTS/SSC 202 requests that resource manager 200 takes buffers from other clients and allows scanner 6 to use the extra buffers. A control signal is sent from controller 7 to scanner 6 telling scanner 6 not to circulate the document stack and to hold the partially scanned document on platen 20 for rescanning. Resource manager 200 responds by reallocating enough buffers to complete the rescan without fault. Buffer allocation is accomplished by scan controller 208 using the information gained from the first scan attempt to predict the buffer space needed, as described above, and applying that information to allow resource manager 200 to allocate the required number of buffers. Once the rescan is completed, controller 7 sends a message to scanner 6 to advance the next document page forward onto platen 20 for scanning.

In the case where a document being printed is complex and requires more buffers than that currently allocated to printer 8, under the control of LTS/SSC 202, resource manager 200 may take buffers away from scanner 6 for use by printer 8. Prior to printing, scan processor 208 sends a message to scanner 6 to hold the document currently on platen 20 in place. When printing of the complex document is completed, resource manager 200 returns the buffers withdrawn from scanner 8 and the document on platen 20 is rescanned.

While the invention has been described with reference to the structure disclosed, it is not confined to the details set forth, but is intended to cover such modifications or changes as may come within the scope of the following claims.

We claim:

1. A process for synchronizing transfer of image data to and from a permanent memory in an electronic printing system having a source of image data communicating with an image output terminal by way of a system memory having a supply of buffers, comprising the steps of:

allocating a first buffer set from the supply of buffers for temporarily holding a first set of image data from the image data source pending transfer to the permanent memory and a second buffer set from the supply of buffers for temporarily holding a second set of image data from the permanent memory to the image output terminal;

filling the second buffer set with the second set of image data from the permanent memory and transferring the second set of image data from the second buffer set to the image output terminal;

monitoring a rate at which the second set of buffers is being emptied and a rate at which the second buffer set is being filled up with image data from the permanent memory; and reallocating a buffer of the first buffer set to serve as a buffer for the second buffer set when the rate at which the second buffer set is being emptied is less than the rate at which the second buffer set is being filled.

2. A process as described in claim 1 in which the image data source comprises an automatic document handler having a scanning cycle for scanning image bearing documents and converting the document images to the first set of image data, further comprising the step of temporarily interrupting the document scanning cycle of the document handler when the rate at which second buffer set is being emptied is less than the rate at which the second buffer set is being filled.

3. A process as described in claim 2, further comprising the step of retaining a document currently being scanned in place for rescanning on interruption of the document handler scanning cycle.

4. A process for synchronizing transfer of image data to and from a permanent memory in an electronic printing system having a source of image data communicating with an image output terminal by way of a system memory having a supply of buffers, comprising the steps of:

allocating a first buffer set from the supply of buffers for temporarily holding a first set of image data from the image data source pending transfer to the permanent memory and a second buffer set from the supply of buffers for temporarily holding a second set of image data from the permanent memory pending transfer to the image output terminal;

filling the first buffer set with the first set of image data from the image data source and transferring the first set of image data from the first buffer set to the permanent memory;

monitoring a rate at which the first set of image data is being emptied from the first buffer set and a rate at which the first buffer set is being filled up with the first set of image data from the image data source; and reallocating a buffer of the second buffer set to serve as a buffer in the first buffer set when the rate at which the first buffer set is being emptied is less than the rate at which the first buffer set is being filled.

5. A process as described in claim 4 in which the image data source comprises an automatic document handler having a scanning cycle for scanning image bearing documents and converting the document images to the first set of image data, further comprising the step of temporarily interrupting the document scanning cycle of the document handler when the rate at which first buffer set is being emptied is less than the rate at which the first buffer set is being filled.

6. A process as described in claim 5, further comprising the step of retaining a document currently being scanned in place for rescanning on interruption of the document handler scanning cycle.

* * * * *